United States Patent
Diochon et al.

(10) Patent No.: US 8,579,230 B2
(45) Date of Patent: Nov. 12, 2013

(54) ATTACHMENT PYLON FOR AIRCRAFT TURBOSHAFT ENGINE, COMPRISING REAR FLAPS WITH MOBILE INCIDENCE

(75) Inventors: Lionel Diochon, Toulouse (FR); Steve Bedoin, Toulouse (FR); Damien Prat, Colomiers (FR)

(73) Assignee: AIRBUS Operations S.A.S., Toulouse (FR)

( * ) Notice: Subject to any disclaimer, the term of this patent is extended or adjusted under 35 U.S.C. 154(b) by 327 days.

(21) Appl. No.: 13/078,460

(22) Filed: Apr. 1, 2011

(65) Prior Publication Data

US 2011/0248116 A1 Oct. 13, 2011

(30) Foreign Application Priority Data

Apr. 8, 2010 (FR) ...................................... 10 52653

(51) Int. Cl.
  *B64D 27/00* (2006.01)
  *B64C 13/16* (2006.01)
  *B64C 9/00* (2006.01)
(52) U.S. Cl.
  USPC .............................................. 244/54; 244/87
(58) Field of Classification Search
  USPC .................. 244/54, 55, 211–217, 87, 75.1
  See application file for complete search history.

(56) References Cited

U.S. PATENT DOCUMENTS

| | | | |
|---|---|---|---|
| 4,966,338 A | 10/1990 | Gordon | |
| 4,979,699 A * | 12/1990 | Tindell | 244/53 B |
| 5,088,661 A * | 2/1992 | Whitener | 244/76 R |
| 5,424,950 A * | 6/1995 | Jackson | 244/192 |
| 5,779,191 A | 7/1998 | Brislawn | |
| 5,895,015 A * | 4/1999 | Saiz | 244/215 |
| 6,860,452 B2 * | 3/2005 | Bacon et al. | 244/194 |
| 8,336,813 B2 * | 12/2012 | Bonnaud et al. | 244/54 |
| 2012/0001022 A1 * | 1/2012 | Morvant et al. | 244/54 |
| 2012/0104161 A1 * | 5/2012 | Shah | 244/52 |
| 2013/0062456 A1 * | 3/2013 | McCollough et al. | 244/17.11 |

FOREIGN PATENT DOCUMENTS

| | | |
|---|---|---|
| FR | 2 619 076 | 2/1989 |
| WO | WO 98/21092 | 5/1998 |

OTHER PUBLICATIONS

French Search Report issued Nov. 18, 2010, in Patent Application No. FR 1052653.

* cited by examiner

*Primary Examiner* — Joseph W Sanderson
*Assistant Examiner* — Marc Burgess
(74) *Attorney, Agent, or Firm* — Oblon, Spivak, McClelland, Maier & Neustadt, L.L.P.

(57) ABSTRACT

An aircraft engine assembly including a turboshaft engine with a propeller and an attachment pylon intended to be laterally attached on a rear portion of the structure of the aircraft is disclosed. The pylon has an outer surface forming an aerodynamic profile incorporating a trailing edge which is arranged upstream of the propeller of the turboshaft engine. The pylon includes a mobile rear flap at least partially defining the trailing edge and a controller which steers the incidence of the flap according to a law depending on the incidence of the aircraft.

6 Claims, 3 Drawing Sheets

ATTACHMENT PYLON FOR AIRCRAFT TURBOSHAFT ENGINE, COMPRISING REAR FLAPS WITH MOBILE INCIDENCE

BACKGROUND OF THE INVENTION (1.) Field of the Invention

The present invention generally relates to an engine assembly for an aircraft, of the type intended to be installed laterally on a rear portion of the aircraft structure, and incorporating a turboshaft engine with one or more propellers.

(2.) Description Of The Related Art

When such an installation is used, the attachment pylon, which establishes the connection between the rear structure of the aircraft and a turboshaft engine, is made so as to have an outer surface forming an aerodynamic profile. In the event the propeller is situated downstream of this profile, the latter creates a wake that, upon impacting the propeller, creates noise.

BRIEF SUMMARY OF THE INVENTION

The invention aims to propose an engine assembly for an aircraft at least partially resolving the abovementioned drawback, relative to the embodiments of the prior art.

To that end, the invention relates to an aircraft engine assembly comprising a turboshaft engine with a propeller as well as an attachment pylon of the turboshaft engine intended to be laterally attached on a rear portion of the structure of the aircraft, said pylon having an outer surface forming an aerodynamic profile incorporating a trailing edge, the latter being arranged upstream of the propeller of the turboshaft engine.

According to the invention, the attachment pylon comprises a mobile rear flap at least partially defining said trailing edge, as well as a control means for said flap designed to steer the incidence of the latter, according to a law depending on the incidence of the aircraft.

The originality of the invention therefore lies in the steering of the incidence of the mobile rear flap of the pylon, as a function of the incidence of the aircraft, so as to create a wake reducing as much as possible, under all circumstances, the noise created by its impact on the propeller.

The steering law, which is determined beforehand by one skilled in the art, can also be chosen such that the stream impacting the propeller offers a good compromise between the noise generated, and/or the thrust generated by said propeller, and/or the load level of the aerodynamic profile. These last two criteria respectively refer to the projection of the propeller forces, and the control of the flow of air over the profile.

Preferably, said law also depends on at least the parameters from amongst the speed of the aircraft, and the positions slats and the flaps of the main wing, i.e. the two main wings each equipped with leading edge slats and trailing edge flaps. Preferably, the law depends on each of these parameters.

Preferably, said mobile rear flap defines the entire trailing edge.

Alternatively, it is possible to provide that said mobile rear flap defines only part of the trailing edge. In this scenario, it is possible for the other part of the trailing edge to be made up of a fixed portion of the pylon, and/or by one or several other mobile rear flaps.

In that respect, it is preferably provided that the attachment pylon comprises several mobile rear flaps each defining part of said trailing edge, each being connected to a control means designed to steer the incidence of its related flap, according to a law depending on the incidence of the aircraft.

In this scenario, the laws for steering the flaps are identical or different. They can differ in particular to take into account the acoustic particularities encountered at the end of the propeller blades.

The propeller turboshaft engine can be a single propeller turboprop, or a turboprop with two despun propellers, for example of the "open rotor" type.

Moreover, the invention relates to a rear aircraft portion comprising at least one engine assembly as described above, laterally attached on the fuselage of the aircraft.

Lastly, the invention relates to an aircraft comprising a rear portion as presented above.

Other advantages and features of the invention will appear in the non-limiting detailed description below.

BRIEF DESCRIPTION OF THE DRAWINGS

This description will be done in reference to the appended drawings, among which.

DETAILED DESCRIPTION OF THE INVENTION

Figure 1:
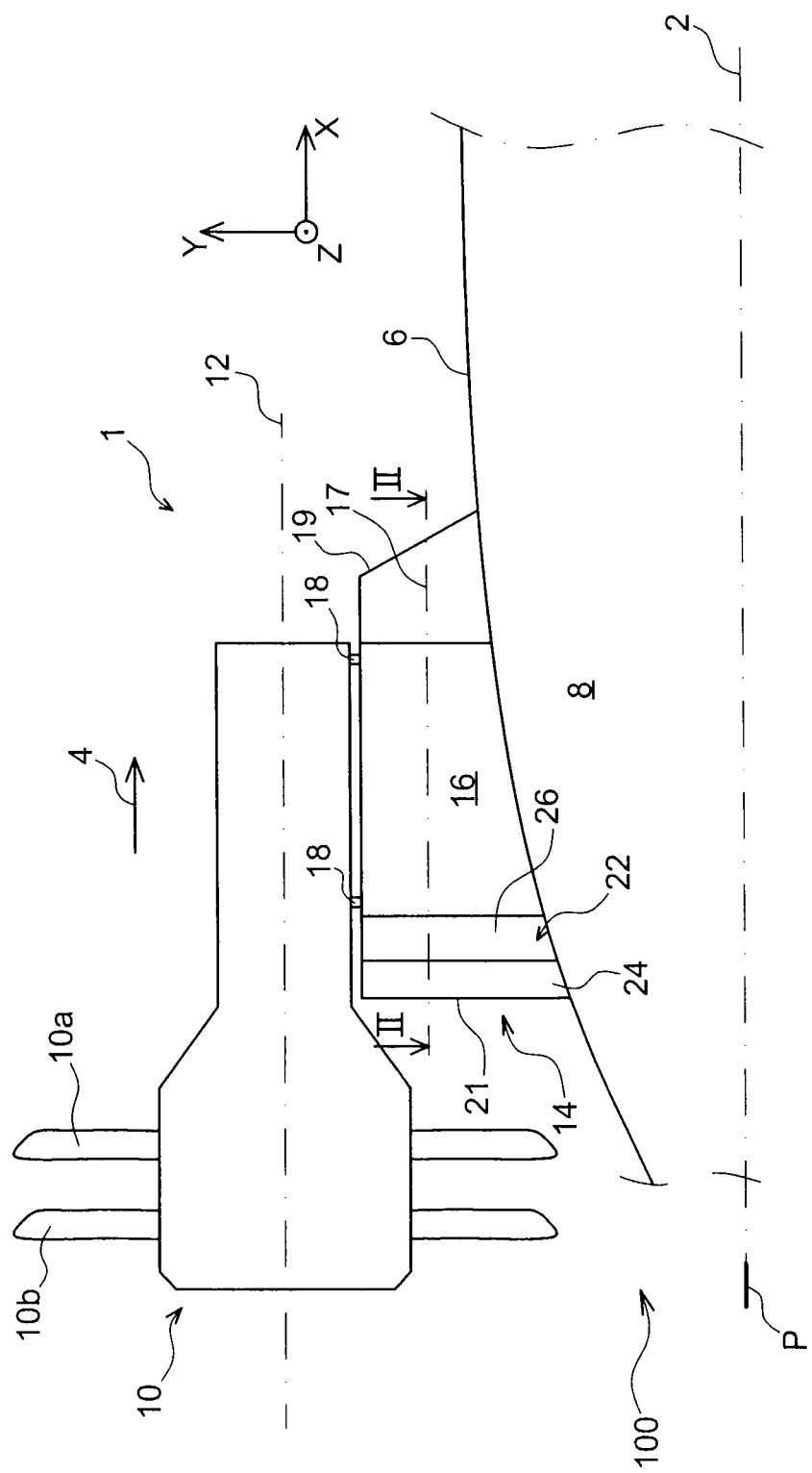
FIG. 1 shows a diagrammatic top view of a rear aircraft portion, incorporating an engine assembly according to one preferred embodiment of the present invention.

FIG. 1 first shows a rear aircraft portion 100 incorporating an engine assembly 1 in the form of one preferred embodiment of the present invention.

Throughout the description that follows, by convention, X refers to the longitudinal direction of the aircraft, which is parallel to a longitudinal axis 2 of said aircraft. On the other hand, Y refers to the direction oriented transversely relative to the aircraft, and Z is the vertical direction or the height, these three directions X, Y and Z being orthogonal to each other.

Moreover, the terms "front", "upstream", "rear", and "downstream" should be considered relative to a direction of travel of the aircraft encountered following the thrust exerted by the engines, this direction being shown diagrammatically by arrow 4.

Globally, the rear portion 100 comprises a fuselage 6, only one portion of the left part of which has been shown. The transverse section of this fuselage is substantially circular, elliptical, or similar, with a center passing through the longitudinal axis 2, and defining an inner space of the aircraft 8.

Moreover, it comprises two engine assemblies (only one being shown) arranged on either side of a vertical middle plane P passing through the axis 2. In the preferred embodiment, each assembly 1 comprises a turboshaft engine 10 with propellers, preferably a turboprop of the "open rotor" type having a pair of despun propellers 10a, 10b. Each of them has a longitudinal axis 12 substantially parallel to the direction X. Moreover, the engine assembly 1 is arranged laterally relative to the fuselage 6, having specified in this respect that an angle can be provided between the middle horizontal plane of the aircraft and the plane passing through the longitudinal axes 2, 12 of the turboshaft engine and the aircraft. Typically this angle can be between 10 and 35°. Whatever the case may be, this engine assembly 1 is laterally attached on the aircraft structure, and more precisely on a rear portion thereof, on the fuselage 6 behind the main wing.

To ensure the suspension of the turboprop 10, an attachment pylon 14 is provided, including a rigid structure 16 also called primary structure through which the stresses coming from the engine 10 are reacted, the rigid structure 16 being dressed in aerodynamic fairings, and in particular a front fairing 17 forming a leading edge 19.

Traditionally, the pylon 14 has fastening means inserted between the engine 10 and the rigid structure 16, this means shown diagrammatically being referenced 18 in FIG. 1. Moreover, the pylon 14 has other fastening means (not shown) inserted between the rigid structure 16 and the structure of the aircraft.

Figure 2:
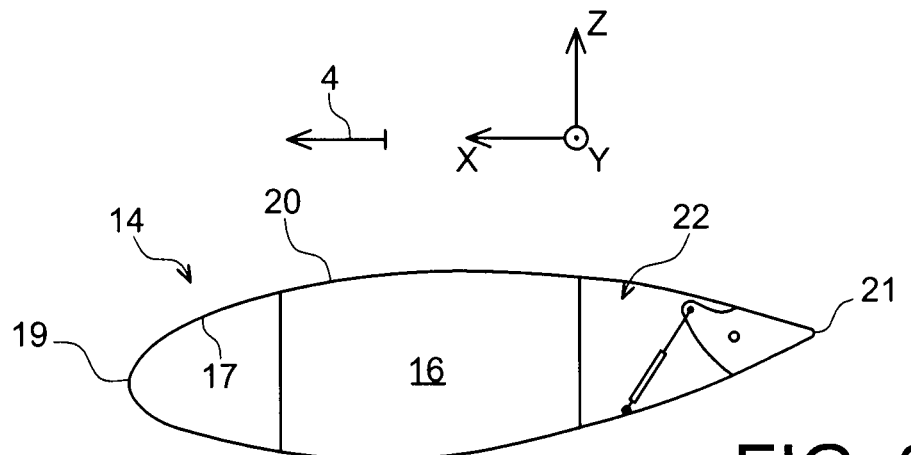
FIG. 2 shows a cross-sectional view of the pylon along line II-II of FIG. 1.

In reference now to FIG. 2, it is possible to see that the pylon 14 has an outer surface forming an aerodynamic profile incorporating the leading edge 19, as well as a trailing edge 21 situated behind the rigid structure 16. Thus, this outer surface 20 is formed, from front to back, by the front fairing 17, the rigid structure 16 preferably faired, and a rear aerodynamic structure 22 ending with the trailing edge 21.

Figure 3:
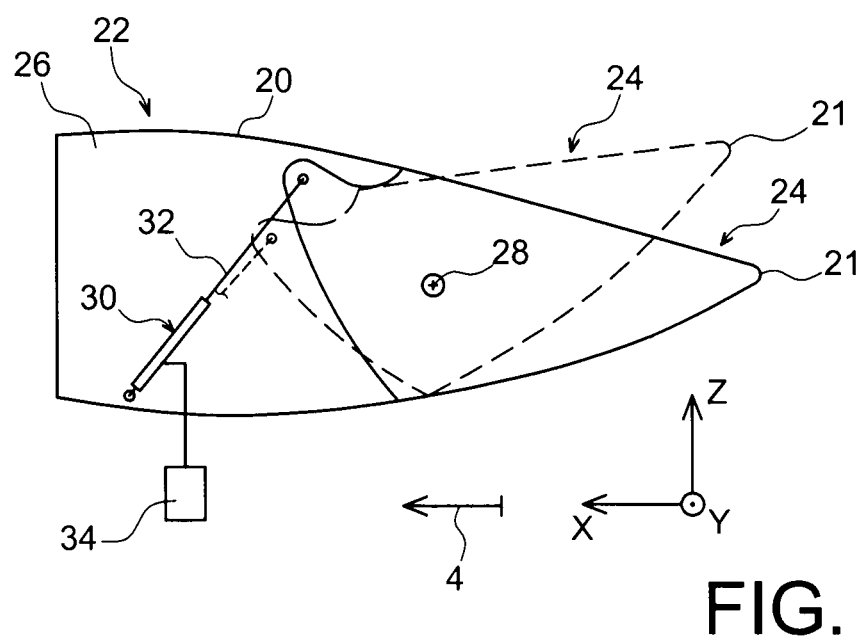
FIG. 3 shows an enlarged view of the rear portion of the pylon shown in FIG. 2.

One of the particularities of the present invention lies in the design of the rear aerodynamic structure 22, shown in figure detail in FIG. 3. Indeed, it ends with a mobile rear flap 24, hinged on a support 26 arranged upstream and constituting the other part of the rear aerodynamic structure 22. The support 26 and the flap 24 both participate in defining the outer aerodynamic surface 20 of the attachment pylon.

The hinge pin 28 of the flap 24 is substantially parallel to the wing span direction of the pylon, which makes it possible to steer the incidence of said flap. In this respect, in FIG. 3, the flap has been shown in solid lines in a given incidence position, and in broken lines in a different incidence position.

To set the incidence of the flap 24, a traditional actuating means known by those skilled in the art is provided, such as a jack mechanism 30, one of the ends of which is hinged on the support 26, and the other end hinged on the flap. The removal and deployment of the piston 32 of said jack then make it possible to create pivoting of the flap 24 relative to its hinge pin 28, as shown in FIG. 3.

The attachment pylon also comprises a means 34 for controlling the flap, connected to the actuating means 30, and designed to steer the incidence of said flap according to a law depending on the incidence of the aircraft.

In other words, the incidence of the flap 24 is steered, as a function of the incidence of the aircraft, so as to create a wake reducing, as much as possible under all circumstances, the noise generated by its impact on the propeller. Thus, the incidence of the rear flap 24 will preferably be different during the take-off, cruising, and landing phases, and may even evolve during each of these three phases, still as a function of the incidence of the aircraft, and possibly also as a function of other criteria deemed appropriate by those skilled in the art, such as the speed of the aircraft, and the positions of the high-lift surfaces, i.e. the slats and the flaps of the two main wings (not shown).

The steering law, which is determined beforehand by one skilled in the art, can also be chosen such that the stream impacting the propellers situated downstream offers a good compromise between the noise generated, and/or the thrust created by said propeller, and/or the load level of the aerodynamic profile.

Here, it is provided that the flap 24 defines the entire trailing edge 21 of the pylon, i.e. extending from the fuselage to the outer lateral end of the pylon, as shown in FIG. 1.

Figure 4:
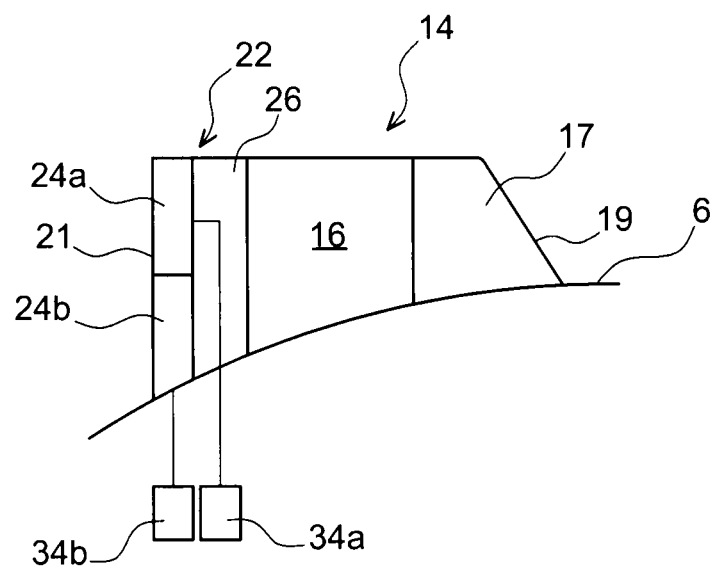
FIG. 4 shows a diagrammatic top view of an attachment pylon portion assuming the form of an alternative embodiment.

An alternative is diagrammed in FIG. 4, which shows a rear aerodynamic structure 22 comprising a support 26 on which two mobile rear flaps 24a, 24b are hinged, adjacent in the direction of the wingspan of the pylon 14. Each of these therefore defines part of the trailing edge 21, and is connected to control means 34a, 34b, respectively. Here, the control means 34a, 34b are also designed to steer the incidence of their associated flaps 24a, 24b, according to laws depending on the incidence of the aircraft, and which can be different from each other. This differentiation makes it possible in particular to take into account the acoustic particularities encountered at the blade ends of the propellers, these particularities therefore being managed by the incidence of the innermost flap 24b, situated opposite the propeller blade ends.

Of course, various modifications can be made by those skilled in the art to the invention described above, purely as non-limiting examples.

The invention claimed is:

1. An aircraft engine assembly comprising:
a turboshaft engine with a propeller; and
an attachment pylon of the turboshaft engine intended to be laterally attached on a rear portion of the structure of the aircraft behind a main wing, said pylon having an outer surface forming an aerodynamic profile incorporating a trailing edge which is arranged upstream of the propeller of the turboshaft engine,
wherein the attachment pylon comprises a first mobile rear flap at least partially defining said trailing edge, a first actuator connected to the first mobile rear flap, a second mobile rear flap at least partially defining said trailing edge and being disposed closer to the rear portion of the structure of the aircraft than the first mobile rear flap, and a second actuator connected to the second mobile rear flap,
wherein a first controller controls the first actuator such that an incidence of the first mobile rear flap is set as a first function of an incidence of the aircraft and a second controller controls the second actuator such that an incidence of the second mobile rear flap is set as a second function of the incidence of the aircraft, and
wherein the first function and the second function are different from each other due to acoustic particularities at blade ends of the propeller, and the second function is further based on the acoustic particularities at the blade ends of the propeller.

2. The assembly according to claim 1, wherein said first and second controllers further control the first and second actuators such that the incidence of the first and second mobile rear flaps is a function of at least one of the speed of the aircraft, or positions of slats and flaps of the main wing.

3. The assembly according to claim 1, wherein the mobile rear flap is hinged on a support via a hinge pin which is substantially parallel to a wing span direction of the pylon.

4. The assembly according to claim 3, wherein the actuator includes a jack mechanism including a piston which is hinged on the flap, and retraction and deployment of the piston creates pivoting of the flap relative to the hinge pin.

5. A rear aircraft portion comprising at least one engine assembly according to claim 1, laterally attached on the fuselage of the aircraft.

6. An aircraft comprising a rear portion according to claim 5.

* * * * *